Oct. 4, 1932.  A. O. TATE  1,880,294
SYSTEM OF SCANNING
Filed Nov. 22, 1929   3 Sheets-Sheet 1

Inventor
ALFRED O. TATE
By his Attorney
Albert M. Austin

Patented Oct. 4, 1932

1,880,294

UNITED STATES PATENT OFFICE

ALFRED ORDE TATE, OF TORONTO, ONTARIO, CANADA

SYSTEM OF SCANNING

Application filed November 22, 1929. Serial No. 408,957.

This invention relates to scanning systems, and more particularly to a scanning disc for use in television.

In scanning an object for television it is desirable to cause the scanning ray to traverse the image in a plurality of substantially parallel paths which are preferably displaced in a direction transverse to their length until the ray has been applied to every portion of the image. The present invention provides a system in which the parallel paths, which will be termed herein as the scanning paths, are caused to traverse the image or the various parts thereof with an undulating or wave motion.

The present invention is particularly useful in scanning large size images in which a considerable movement of the scanning paths is necessary, as for example, an image on a projection screen in which the dimension may extend several feet. If the scanning paths are caused to progress from one side, such as the top of the screen to the opposite side or bottom in scanning a complete image and then, for the subsequent image, are again caused to progress in the same direction, a break is produced between the images which requires the eye to rapidly change its focus from the bottom to the top of the screen. Furthermore, the continued movement of the scanning path in one direction may become apparent to the eye if extended a long distance as would be required in a large size screen.

In accordance with the present invention the movement of the scanning paths is broken up and prevented from being extended a sufficiently great distance or a sufficiently long time to cause the eye to consciously follow the same. Furthermore, sharp breaks in the direction of movement as from the bottom to the top of the screen are avoided.

For this purpose the image is divided into a plurality of parts each of which is separately and successively scanned. The scanning path is caused to traverse each individual part in the form of an undulating wave whereby the movement may be readily followed by the eye and the interruption between the scanning movements over the various parts of the image is sufficient to prevent the movement from becoming apparent to the eye.

The invention also provides a scanning disc in which the apertures are so arranged and are of such conformation that an even intensity of light is applied to the various parts of the image regardless of the difference in peripheral speed of the various apertures due to their varying distances from the center of the disc.

The invention also consists in certain new and original features of construction and combinations of parts hereinafter set forth and claimed.

Figure 1:
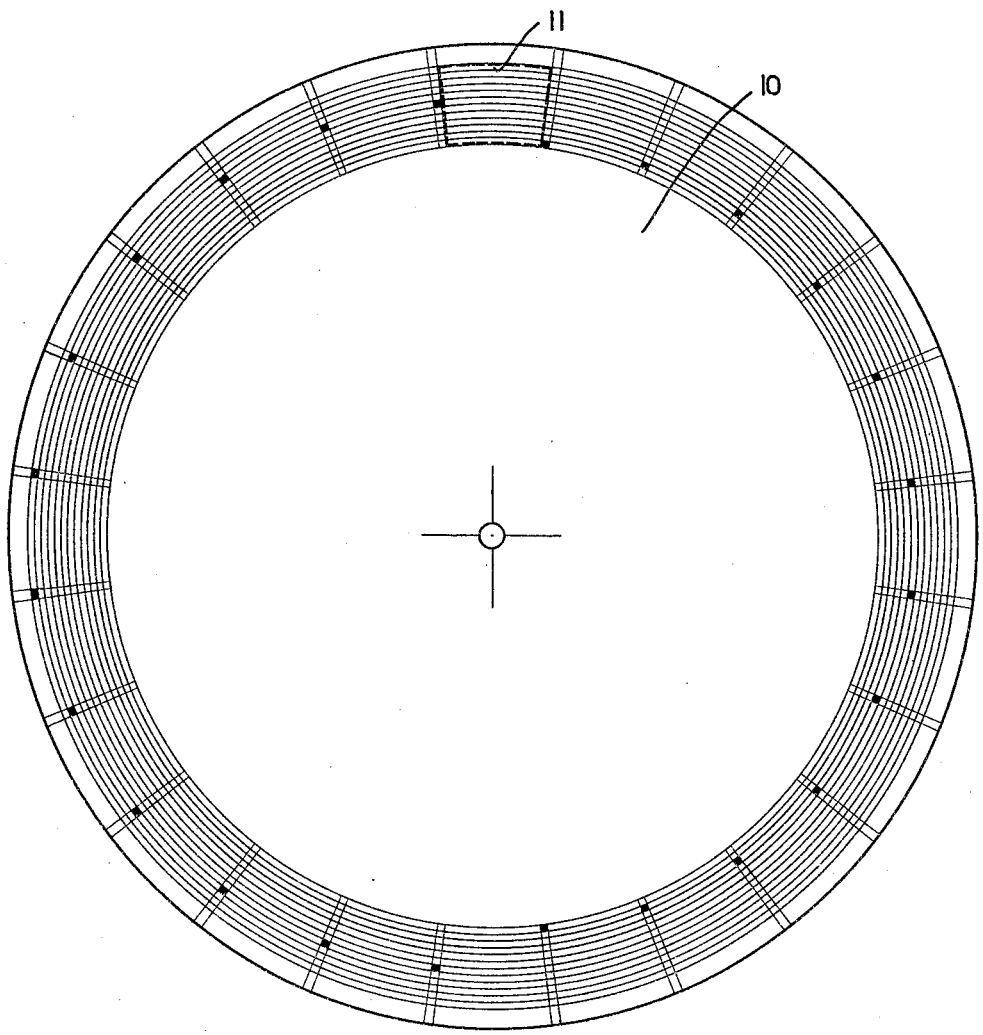
Figure 2:
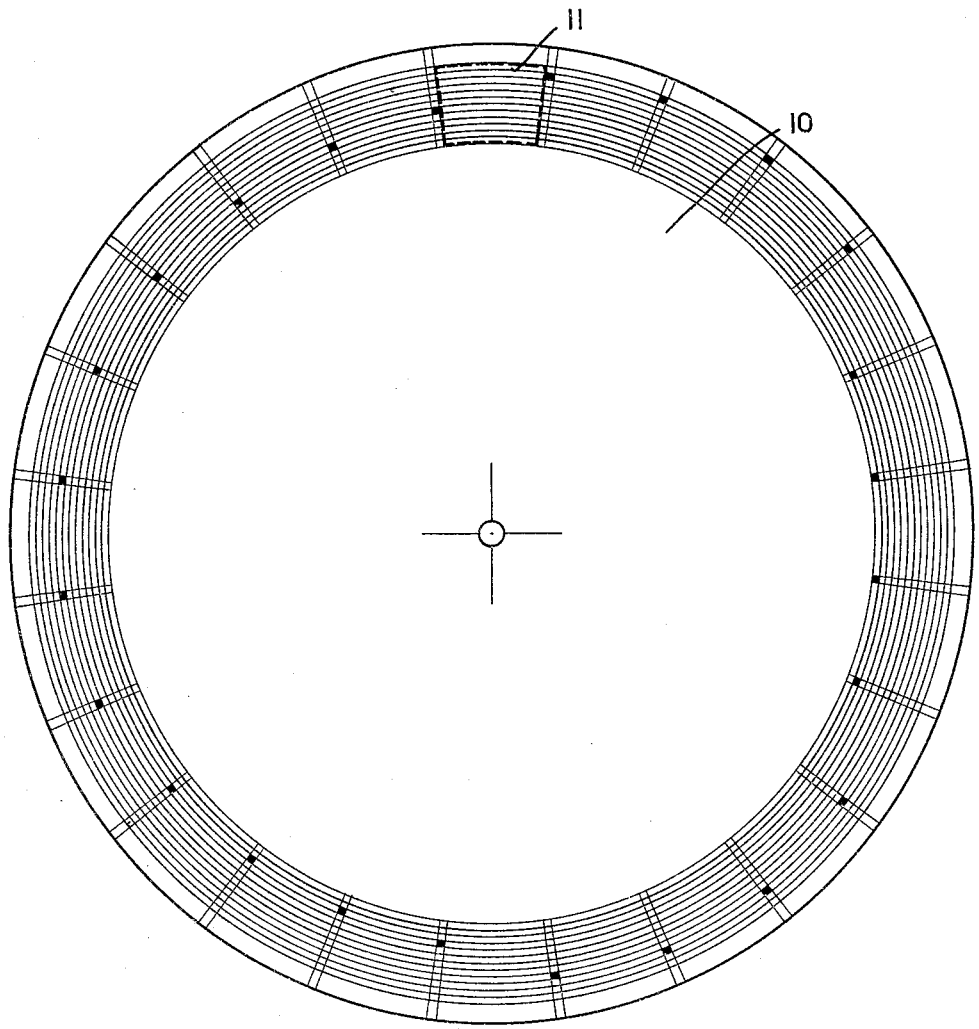
Figure 3:
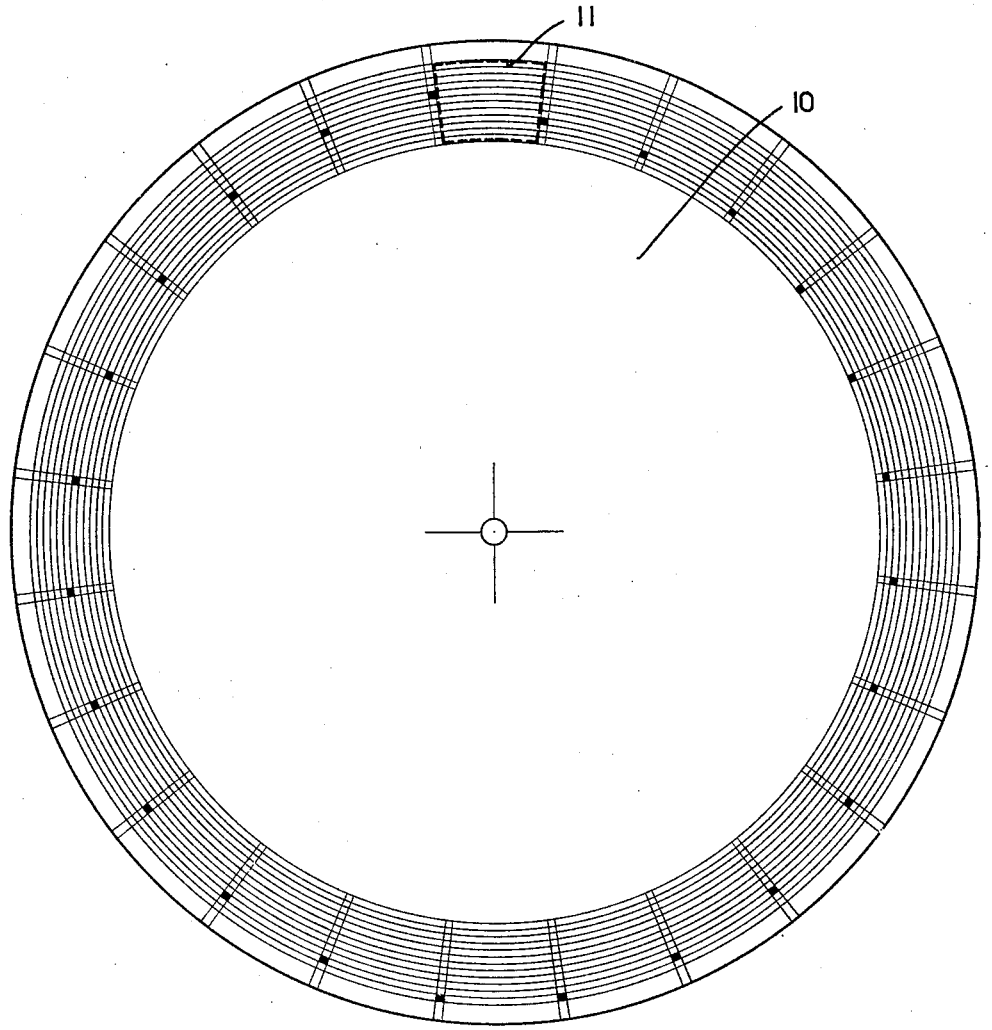

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a plan view of a scanning disc in accordance with the present invention adapted to separately scan the two halves of an image;

Fig. 2 is a plan view of a modified form of disc in which the image is scanned in six parts; and Fig. 3 is a plan view of a further modified form of disc in which the image is scanned in three parts.

Like reference characters denote like parts in the several figures of the drawings.

In the following description and in the claims parts will be identified by specific names for convenience, but they are intended to be as generic in their application to similar parts as the art will permit.

In order to provide for applying the same intensity of light to the various parts of the picture it is necessary to compensate for the different speeds of the scanning ray as the scanning apertures progress from the center of the disc. This is accomplished in the present invention by dividing a disc 10 into a plurality of equally spaced concentric circles and locating each of the apertures in a space bounded by two adjacent circles. For determining the peripheral length of the apertures a plurality of equally spaced radii are drawn. Each aperture is bounded radially by the arcs of the concentric circles and bounded peripherally by adjacent radii. It is evident, therefore, that the various apertures are of the same radian length, regardless of their position on the disc. Since the speed of peripheral movement of the apertures is proportional to their radial distance from the center of the disc and their peripheral length is likewise proportional to this distance, the total light which may be passed through the various apertures is equal. This insures an even light intensity over the entire picture regardless of the size thereof.

Referring to Fig. 1 the apertures are disclosed as arranged to cause the scanning paths to progress over one-half of the image 11 in a wave motion and thereafter to progress over the second half of the image in a similar wave motion. Numbering the concentric spaces occupied by the apertures from the edge toward the center of the disc consecutively 1 to 12 and considering the apertures progressively around the periphery of the disc it is noted that the successive apertures are located in the following numbered spaces: 6, 5, 4, 3, 2, 1, 1, 2, 3, 4, 5, 6, 12, 11, 10, 9, 8, 7, 7, 8, 9, 10, 11, 12.

It is to be noted that the apertures are arranged in groups of six, the first six carrying the scanning path from the center to the outer surface of the image, the second six returning from the outer surface to the center, thereby completely scanning one-half of the image in both directions while the disc is rotated through 180°. The third set of six apertures scans the image from the lower edge to the center and the fourth set from the center back to the lower edge, thereby completely scanning the lower one-half of the image during the second 180° rotation of the disc.

During the complete rotation thereof the upper one-half of the image is scanned in a complete wave starting and ending at the center, and the lower one-half of the image is scanned in a complete wave starting and ending at the bottom. In no case is there a sharp break which would require the eye to travel instantaneously from the top to the bottom of the image while the break between the scanning of the upper and lower halves of the image prevents the travel of the scanning path from being extended sufficiently long to become apparent to the eye.

Referring to Fig. 2 a modified form of disc is shown in which the image is divided into six parts which are separately scanned. Numbering the spaces as above outlined the apertures are arranged in the following order: 7, 8, 8, 7, 6, 5, 5, 6, 9, 10, 10, 9, 4, 3, 3, 4, 11, 12, 12, 11, 2, 1, 1, 2.

It is to be noted that not only is the image divided into a plurality of parts which are separately and successively scanned, with an undulating motion of the scanning path but said parts on opposite sides of the median line of the image are alternately scanned beginning at the two central portions and ending at the two outside sections. Each part is scanned by complete wave motion and a minimum jump is required to the next successive part of the image. By alternating the order of scanning of the various sections the travel of the scanning path is prevented from becoming apparent to the eye and at the same time a minimum change in focus is required.

Referring now to Fig. 3 a further modified form of the invention is disclosed in which the image is divided into three parts which are alternately and successively scanned with an undulating motion. Referring to the numbers as outlined above the apertures are arranged in the following order: 5, 6, 7, 8, 8, 7, 6, 5, 4, 3, 2, 1, 1, 2, 3, 4, 9, 10, 11, 12, 12, 11, 10, 9. With this type of scanning disc the undulations are carried over a larger section of the picture and the jump between successive portions is correspondingly greater.

In the above described systems a particular number of apertures has been disclosed by way of illustration only and it is obvious that these numbers may be varied as desired in accordance with the size of the scanning ray and the size of the image to be scanned. The number of scanning paths involved in each undulation may be varied accordingly and the number of sections into which the image is sub-divided may be correspondingly varied. The scanning discs have been shown as arranged for scanning a keystone image 11. A rectangular image or images of other shapes may be substituted for this keystone image provided the peripheral spaces between successive apertures is changed to correspond thereto.

The sectional, alternating, undulating system of the present invention has been disclosed as applied to a scanning disc, but it may be applied to various other systems of scanning which are well known in the art. While the scanning paths are in the form of concentric circles they have been referred to as parallel paths inasmuch as the radius of the disc is usually large in proportion to the size of the image to be scanned. In certain other scanning systems, as for example, a drum, hoop or belt, the scanning ray would follow substantially straight parallel paths.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. A method of scanning an image which comprises causing the scanning path to traverse and retraverse a portion of said image with an undulating motion and then causing a sudden shift of said scanning path to another portion of said image and causing said path to traverse said other portion with an undulating movement whereby to successively and completely scan the different portions of said image.

2. A scanning disc comprising a plurality of peripherally spaced apertures, each of said apertures being bounded by the arcs of concentric circles and the radii of said disc, said apertures being arranged in groups, each group being adapted to completely scan a portion of an image, the adjacent apertures of successive groups being laterally displaced whereby the scanning path is caused to rapidly shift between successive portions over a distance greater than the normal distance between successive scanning paths and less than the total width of said image.

3. A method of scanning an image which comprises dividing said image into a plurality of parts, each part being several scanning bands in width, causing the scanning path to be progressively displaced to completely scan each of said parts and causing a sudden shift in the scanning path between the successive parts.

4. A method of scanning which comprises dividing an image into a plurality of parts, each part being several scanning bands in width, causing the scanning path to be successively displaced for scanning each of said parts, completely scanning the various parts in irregular order and causing said path to suddenly shift in position between successive parts.

5. A scanning disc having a plurality of apertures arranged in groups, the apertures of each group being arranged to completely scan a different portion of an image and adjacent apertures of successive groups being displaced laterally of said image whereby a sudden shift in the position of the scanning path is obtained between successive portions of said image.

6. A scanning disc having a plurality of apertures arranged in groups, the apertures of the various groups being arranged to progressively traverse and retraverse a different portion of an image with an undulating motion, the adjacent apertures of successive groups being transversely displaced by a distance greater than the normal distance between successive scanning paths, whereby a sudden shift in the position of the scanning path is obtained between successive portions of said image.

7. A method of scanning an image which comprises dividing said image into a plurality of parts and causing the scanning path to completely traverse one of said parts with an undulating motion and to scan the outer elements of said part twice in succession whereby an equalization of light is obtained, then causing a sudden shift of said scanning path to another of said parts and repeating the scanning movement in said other part and continuing the successive scanning of the various parts until the image is completely scanned.

In testimony whereof I have hereunto set my hand and seal.

ALFRED ORDE TATE. [L. S.]